United States Patent Office 3,417,722
Patented Dec. 24, 1968

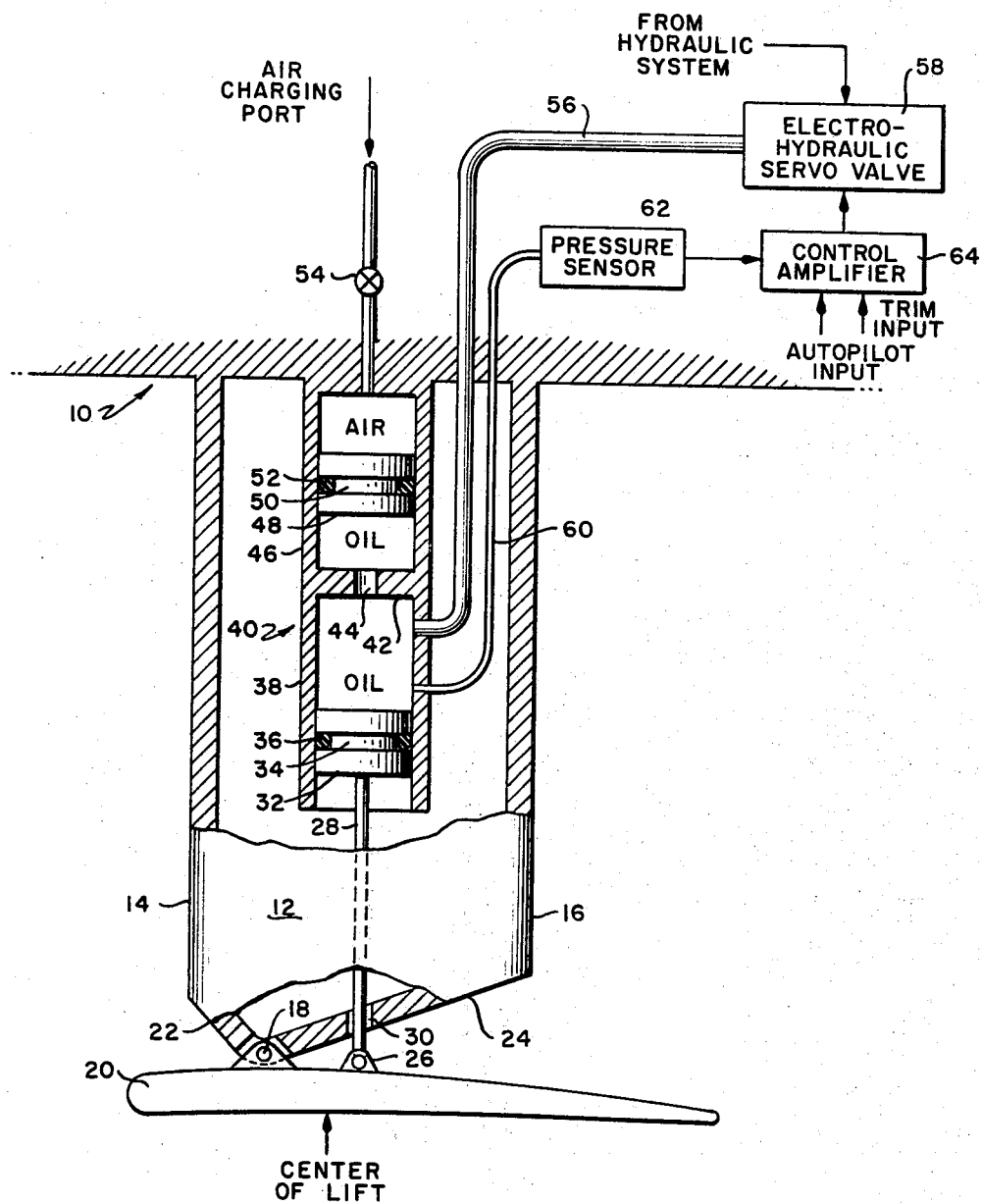

3,417,722
HYDRAULIC SUSPENSION AND CONTROL SYSTEM FOR HYDROFOIL CRAFT
William C. O'Neill, Montgomery County, Md., assignor to the United States of America as represented by the Secretary of the Navy
Filed June 28, 1967, Ser. No. 650,163
9 Claims. (Cl. 114—66.5)

ABSTRACT OF THE DISCLOSURE

A soft hydraulic suspension and control system, for hydrofoil craft using submerged hydrofoils having a movable foil pivoted forward of its center of lift, and a control rod attached thereto for changing the angle of attack, operated by an oil pressure piston and cushioned by a pneumatic spring.

Background of the invention

The present invention relates to hydrofoil craft using submerged hydrofoils and more particularly to a soft suspension and control system for the submerged foils which will attenuate the lift disturbances caused by non-uniform wave motion across the foil, thereby smoothing out the rough ride of the craft and which system is greatly simplified and requires less power than the prior art control systems.

It should be recognized at the outset that on submersed hydrofoil type craft, the foil cannot be set at a fixed angle of attack. The angle of attack must be adjustable so as to maintain equilibrium between the weight of the craft and the lift of the hydrofoil both of which change due to different speeds and loads in the craft. Partially-submerged hydrofoils, in the form of a V or a W or sometimes in a ladder configuration, may have a fixed angle of attack because they automatically attain equilibrium of craft weight to lift as a portion of them emerge from the water. Only that portion of the foil that is required to provide an amount of lift equal to the weight of the craft remains submerged. Workers in the field of submerged hydrofoil craft have devised methods of controlling the angle of attack of the submerged foils to automatically control the height of the craft above the water and to maintain equilibrium of weight and lift, but these systems generally require a considerable amount of power and are complicated in order to take into consideration high frequency wave disturbance forces and to compensate for changes in speed and weight of the craft by automatic means.

In particular, a patent to Burtenbach, No. 2,257,406, contemplates the use of a mechanical spring and a geometric arrangement for balancing the lift with the weight of the craft to provide a smooth ride but the spring which, due to its fixed spring constant, will require adjustment for different weights and speeds of the craft.

Summary

The instant invention solves the aforementioned problems and disadvantages of the prior art by the use of a pivoted foil and hydraulic control system which will smoothly and automatically compensate for lift disturbances caused by wave motion when the craft is foilborne. An increase in lift caused by increase in the angle of attack, due to the orbital velocity of the waves, will tend to pivot the foil to a lesser angle of attack thereby automatically decreasing the lift. In essence the foil will weathervane to a controlled extent in order to compensate for short, high frequency wave disturbances.

This advantage is attained by placing the pivot point of the foil forward of its center of lift so that an upward wave disturbance force will act on the foil behind the pivot point to rotate the leading edge downward so as to decrease the angle of attack and thereby reduce the lift. Conversely, a downward wave disturbance force acting behind the pivot point will increase the angle of attack, increasing lift. A hydraulic control system providing control forces is attached to the foil behind the pivot point through a piston and control rod and is used to set and trim the nominal angle of attack of he foil. This hydraulic control system is provided with a pneumatic spring or accumulator so that the angle of attack of the foil may vary about the nominal setting in a smooth manner when compensating for lift disturbances due to wave motions.

In essence, the craft is supported on foils which are cushioned in manner much like an automobile suspension system which supports an automobile. Preliminary experiments indicate that forces as low as 0.05 g may be attained when utilizing this invention, whereas before, force of 0.6 g were common at normal cruising speeds creating great stresses on the craft structure and, of course, creating discomfort for the crew.

Accordingly, it is the primary object of this invention to provide a soft suspension and control system for submerged hydrofoil craft.

Another object is to provide automatic means to maintain equilibrium between lift and weight of a hydrofoil craft.

Still another object of this invention is to compensate for the major wave disturbance forces with a simplified hydraulic suspension system which requires less power to operate and which thereby simplifies the automatic control system.

Other objects and features of the invention will become apparent to those skilled in the art as the disclosure is made in the following detailed description of the preferred embodiment of the invention as illustrtaed in the accompanying sheets of drawings in which:

Brief description of the drawings

The figure is a schematic side elevation of a hydrofoil strut with a submerged foil attached, partially broken away to show the suspension and control system.

Description of the preferred embodiment

Referring now to the drawing there is shown in the figure a strut or fin 12 subjacent and extending generally vertically from the hull 10 of a hydrofoil craft. The strut 12 may be rigidly attached to the bottom of the hull or fixed by hinges so that it may be rotated laterally from the side of the craft out of the water so as to clear a shallow bottom when the hydrofoil craft is operating on its main hull. The major dimension of the fin 12 runs fore-and-aft between the leading edge 14 and the trailing edge 16 and these edges may be sharp-edged so as to reduce drag to a minimum, and the athwart-ship dimension of the fin is kept small for the same purpose, but is sufficient so that a hydraulic control cylinder (to be disclosed later) may be included within the fin. At the lower extremity of the fin 12 there is provided a pivot point 18 which will permit the hydrofoil 20 to rotate up and down about an athwart-ships axis. The bottom of the fin or strut 12 is cut away at 22 and 24 to avoid interference with pivoting motion of the hydrofoil 20. Aft of the main pivot point 18 on the hydrofoil 20 there is an attachment point in a form of a clevis 26 which will permit the attachment of a control rod 28 which extends upwardly into the fin through a port or aperature 30 which may be sealed as desired. The control rod 28 terminates and is attached to a piston 32. About the periphery of the piston at the midsection there is formed a groove 34 for the purpose of maintaining an O-ring 36. This O-ring is in sealing relationship with the inner wall of cylinder 38. Cylinder 38 comprises the lower portion of the main cylinder, generally described at 40 which is divided by a partition 42 having therein a small orifice 44. The upper cylinder portion 46 contains a free piston 48 about the periphery and at its mid-section there is formed a groove 50 which retains a O-ring 52. This O-ring is in sliding sealing relationship with the inner wall of the cylinder 46. Above the piston 48 a portion of cylinder 46 confines compressed gas which may be admitted through the charging port and contained by valve 54. The air chamber thus formed acts as an air accumulator or pneumatic spring.

Below the free piston 48 there is contained within the cylinder 40 hydraulic oil which communicates through the orifice 44 into the cylinder 38 above the piston 32. Provided within the side of the cylinder 38 is a conduit 56 containing hydraulic fluid at pressure and which is controlled by the electrohydraulic servovalve 58. Another conduit 60 communicates with the cylinder 38 to a pressure sensor 62 which provides a signal to the control amplifier 64 for maintaining a constant pressure within the cylinder 38 thereby maintaining piston 32 and the hydrofoil 20 connected thereto, at the proper position. The control amplifier 64 receives inputs from other sources such as trim and auto pilot so that the electrohydraulic servovalve 58 is activated to subsequently position the hydrofoil 20 to properly trim the vehicle and to position it above the surface to the water at the proper height.

*Description of the operation*

As previously described it is necessary in submerged hydrofoil type craft to provide a dynamically moving hydrofoil that is, one in which angle of attack may be varied to maintain equilibrium between the craft weight and the lift of the hydrofoil. The hydrofoil 20 is extended into the water from the hull 10 by virtue of the strut 12 which carries the main weight of the hydrofoil craft when operating above the surface of the water. A height sensor mounted on the hull (not shown or described in this application) provides an input to the control amplifier 64 which controls an electro-hydraulic servovalve 58. This servovalve allows pressure from the hydraulic system to enter the cylinder 38 through conduit 56 thereby forcing piston 32 down and increasing the angle of attack of the hydrofoil 20 which will, of course, lift the vessel higher above the water's surface. Conversely, the pressure in the cylinder 38 may be reduced thereby allowing the hydrofoil 20 to decrease its angle of attack and lower the vessel to the proper position above the water. To trim the vehicle in roll and in pitch, input signals are provided to the control amplifier 64 which again controls the servo valve 58 properly positioning the aforementioned piston and hydrofoil 20. The hydrofoil described is one of perhaps three that may be attached to such a hydrofoil craft and it therefore becomes evident that each foil must be controlled for trimming adjustment of the craft.

When the hydrofoil 20 is running submerged at normal operating speeds it encounters waves having orbital velocity forces below the surface of the water which impenge upon the hydrofoil either from above or below, in other words at different angles of attack. These wave disturbances would ordinarily cause a fixed foil to either abruptly lift or drop the hydrofoil craft causing a rough ride. The hydrofoil 20 is pivotally attached to the protruding fin 12 where its center of lift is behind its main pivot point 18. When a wave disturbance is encountered tending to lift the foil, it operates at the center of lift point (shown in the figure) and rotates the foil to a lesser angle of attack. This controlled motion of the foil is permitted by virtue of the fact that the hydraulic oil in cylinder 38 will be forced through the orifice 44 and will press piston 48 against the air in the chamber above it. This air will compress in a normal manner thus providing a spring cushion to smooth out the ride of the vehicle. Initially, of course, air will have to be admitted to the space above piston 48 through a charging port and valve 54 which is later closed off. Conversely, a wave disturbance from above the foil, tending to force the hydrofoil downward, acts at the center of lift and causes the hydrofoil 20 to rotate so as to increase the angle of attack and thereby maintain the lift at a constant figure.

Much of the weight of the hydrofoil craft borne by the hydrofoil 20 may be transmitted through the pivot point 18 and therefore little force is transmitted into the hydraulic control system which may therefore be kept small and simple in construction.

The pressure sensor 62 communicating with the cylinder 38 through conduit 60 provides a feedback signal to the control amplifier 64 to maintain the hydraulic oil at a constant and sufficient pressure to initially adjust the foil's angle of attack and to compensate for speed and weight variations in the craft.

Although a specific embodiment has been shown and described for the purposes of illustration, it is to be understood that the invention is not resrticted thereto but that various changes and advantages will be apparent to one skilled in the art. The invention is only to be limited in accordance with the scope of the following claims.

What is claimed is:

1. A hydrofoil suspension control system for hydrofoil craft comprising:
   a fin projecting substantially vertically from the hull of a hydrofoil craft;
   a hydrofoil pivotally attached to the terminal end of said fin whereby the angle-of-attack of said hydrofoil may be varied;
   a hydraulic control cylinder operatively connected to said hydrofoil for varying the angle of attack; and
   an air accumulator cooperating with said hydraulic cylinder whereby the hydrofoil movement is cushioned against abrupt shock.

2. The device of claim 1 wherein the air accumulator is separated from the oil in said hydraulic cylinder by a free floating piston.

3. The device of claim 2 wherein the air accumulator may be charged and sealed via a charging port.

4. The device of claim 3 wherein said hydraulic cylinder and said air accumulator are integral and mounted within said projecting fin.

5. The device of claim 4 further comprising:
   an electro-hydraulic servovalve controlling the pressure within said hydraulic control cylinder to position and hydrofoil at an angle of attack;
   a control amplifier for actuating the operation of said servovalve; and
   a plurality of inputs commanding said control amplifier.

6. The device of claim 5 wherein said plurality of inputs comprises:
   an auto pilot input for controlling the craft's height above the water;
   a trim input for trimming the craft in pitch and roll; and
   a pressure sensor input receiving signals from said hydraulic cylinder.

7. The device of claim 1 wherein the pivot point of said hydrofoil is disposed forward of the center of lift.

8. The device of claim 7 wherein said hydraulic control cylinder is attached to said hydrofoil aft of the center of lift.

9. The device of claim 8 wherein the moment arm between the pivot and the control attachment is greater than the moment arm between the pivot and the center of lift thereby reducing the amount of control force necessary to change the angle of attack of said hydrofoil.

References Cited

UNITED STATES PATENTS 3,157,146   11/1964   Billig _____ 114—66.5

ANDREW H. FARRELL, *Primary Examiner.*